Aug. 11, 1959  F. ADAM  2,899,027
JAIL LOCKING DEVICES, AND THE LIKE
Filed July 2, 1956  6 Sheets-Sheet 3

Inventor:
Folger Adam,

Aug. 11, 1959 F. ADAM 2,899,027
JAIL LOCKING DEVICES, AND THE LIKE
Filed July 2, 1956 6 Sheets-Sheet 4

Inventor:
Folger Adam,
by
Atty.

Aug. 11, 1959    F. ADAM    2,899,027
JAIL LOCKING DEVICES, AND THE LIKE
Filed July 2, 1956    6 Sheets-Sheet 5

Inventor:
Folger Adam,
by [signature]
Attys.

Aug. 11, 1959  F. ADAM  2,899,027
JAIL LOCKING DEVICES, AND THE LIKE
Filed July 2, 1956  6 Sheets-Sheet 6

Inventor:
Folger Adam,
by
Atty.

2,899,027

JAIL LOCKING DEVICES, AND THE LIKE

Folger Adam, Joliet, Ill.

Application July 2, 1956, Serial No. 595,495

4 Claims. (Cl. 189—7)

This invention relates to improvements in jail locking devices, and the like. The improved jail locking devices herein disclosed are of comparatively simple form and construction, but are of form such that they may be used either for the control of single cell installations, or for control of a number of cells in gang arrangement.

The improvements herein disclosed include the provision of a control bar extending from a control position to the cell or cells to be controlled thereby. This control bar may be manually shifted to a selected position by the guard or other authorized person. When a number of cells are to be controlled by such bar it becomes a "gang" control bar. For purposes of convenience in nomenclature I shall hereinafter refer to such bar as the gang control bar, but with the understanding that the installation in which such bar is incorporated may be for either a single cell or a group of cells as required.

The selected positions to which the control bar may be shifted include (A), a "deadlocked" positioned in which the locking devices for the several cells are retained in locked condition, and a deadlocked cell cannot be unlocked by any local operation, or, by any attempted unlocking operation performed at or near such deadlocked cell, additionally, with the control bar in this "deadlocked" position the door is locked in its closed position by a locking unit at its upper end and by a second locking unit either in the central portion of the closing edge of the door or at the lower edge of the door and both of such locking units (top of the door and a second locking unit) are deadlocked by elements which positively interfere with movement of said locking units from their locking positions and make it impossible to disengage either of such locking units from their locking positions while the control bar remains in its "deadlocked" position; (B), an "automatic" position in which the several door locking elements are not deadlocked as in the case of "A," above, but when the control bar is in this position "B" the locking elements of the several doors may be locally operated, as by local key lock operations, so that selected cells may be thus unlocked locally; and (C), an "unlocked" position of the control bar. When the control bar is shifted to this position selected locking devices for selected doors will be unlocked by such shift of the control bar to this position. The present disclosures include means whereby such selection of actuation of the door locking device for any door by such control bar movement is effected by a key actuated element located at the location of the door in question, so that the guard may, by such local key operation, determine in advance which door or doors shall be unlocked by such shift of the control bar to such position "C." Having made such selection in advance, only the locking devices for the so-pre-conditioned doors will be unlocked by the subsequent movement of the control bar to such position "C."

When the control bar is in its position "A" for deadlocking, any given door being in its closed position, such door will be locked at two positions, one of which is its upper edge portion, and the locking at the other position also being effective provided the local key operation unit is in proper position to ensure such locking at such other position. Also, the second locking operation (other than the locking at the upper edge portion of the door), is effected directly at the location of the key operated unit, generally some distance above the lower edge of the door.

I have stated that the control bar may be moved to a selected one of three positions defined as "A," "B" and "C." I have provided a vertical locking bar adjacent to the closed door position, and conveniently enclosed within a pilaster of the structure according to conventional practice. The vertical movements of such locking bar are effected or controlled by the movements of the control bar between its three defined positions. In the specific embodiments herein illustrated they are of the longitudinal movement type, but I do not intend to limit myself to such longitudinal movement type, except as I may limit myself in the claims to follow. It is here noted that the construction is such that the locking element for the upper portion of the door is normally down and in its locking position; that when the control bar is in its "A" or "deadlocked" position said upper door locking element is positively locked down in its door locking position by the control bar itself, and not by the vertical locking bar; and that the arrangements are such that when the control bar is moved to its "C" position such locking element for the top portion of the door is directly raised into the unlocking position by the control bar and held in such position by the control bar without any operating force developed by or coming from the vertical locking bar or force originating at the key-lock unit. These conditions are the direct results of the present construction in which the vertical locking bar does not produce any down locking force on the locking element for the upper portion of the door, but in which construction the vertical locking bar may, on occasion, be raised by the key-lock unit to unlock such upper door portion locking element when the control bar is in its "B" position. In position "A," previously defined, such vertical locking bar is in its fully lowered position, and is retained in such position by the configuration of the control bar. In such locked down position both of the door locking elements are retained in their lowered positions and against any rise such as would be necessary to permit door unlocking to occur. In position "B" of the control bar such vertical locking bars for the several doors are still in their lowered positions, but they are now released so that they can be raised by extraneous means, such as by key operations or otherwise. However, as long as the vertical locking bars remain in their so-lowered positions their respective doors remain locked, or in any case the door engaging elements for the respective doors remain in position for snap-locking on occasion, when the doors are brought to their fully closed positions. In position "C" of the control bar the several vertical locking bars are raised by such control bar thus unlocking such of the doors as have been otherwise conditioned for such unlocking to take place. Such raising of the locking bar for any selected door may or may not produce complete unlocking of such door, depending on the position and condition in which the key operated device is then found.

I have herein disclosed and will describe both of such embodiments in full detail hereinafter. It is here noted that when the control bar is in its position "B" so that the locking bar is not positively locked down by the control bar it may be raised by an convenient means provided for such purpose. Such raising may be effected by proper operation of the key unit. But it is further noted that the key operated unit is of such construction that the raising of the vertical locking bar for each door by control bar movement to position "C," or by extraneous means, does not necessarily produce complete door unlocking of such door, depending on the condition of key operation then in effect for such door installation. Thus, it is possible to isolate any selected door installation from gang operation, while permitting the other door or doors to function completely according to the normal gang operation by the control bar's movements.

I have provided herein, and shall disclose in full detail the means which I have provided to enable all such and other operations to be performed.

I have referred to the provision of extraneous means to effect unlocking movements of the vertical locking bar of any selected door installation, under proper control conditions which have already been outlined. Conveniently such extraneous means takes the form of electrically operated solenoids or other units, and may be controlled conveniently from a suitable control stand. For this purpose I have, in such stand, provided for individual electrical operations of the several locking bars, when the control bar is in its proper position, or for electrical gang operation of a plurality of the locking bars if desired. Such arrangements will be fully disclosed hereinafter.

I here point out, however, that in the embodiments of vertical locking bars and key-operated locking and control devices herein disclosed, and in similar structures, when the vertical locking bars of a gang of cells are raised by mechanical means by operation of a mechanical gang operating bar, the jamming of any one of such locking bars against vertical movement will disable the locking bar operations of all of the cells of such gang so that they cannot then be gang operated. Such a condition will be referred to hereinafter. On the contrary, by providing individual electrical drive means for the locking bars of the individual cell doors, it is possible to also provide gang circuits for gang operation of the locking bars of a gang of cells and to produce proper operation of all of the locking bars of such group or gang except one or more of the locking bars which may have been jammed. The jamming of one or more of the locking bars of such gang will not prevent proper gang operation of the other locking bars of such gang. This will be referred to hereinafter.

I have provided a control stand arrangement at which suitable instrumentalities are provided to enable the guard or other authorized person to control and operate the several door locking elements as well as the control bar itself. Since the present disclosure does not include means to actually move the doors themselves (other than "door starters" of conventional form), the force and power needed to shift the control bar between its several positions is comparatively small. The maximum force needed for such operation would be that required for raising all of the vertical locking bars when shifting the control bar from its position "B" to its position "C." However, such raising of the vertical locking bars might be produced by the electrical means already referred to when the control bar had been shifted to its position "B"; and after thus electrically raising the vertical locking bars the control bar could then be readily shifted to its position "C," thus retaining the several locking bars in their raised positions. Accordingly, I have disclosed in such control stand manual means to shift the control bar between its several positions.

I have in such control stand also disclosed push button or switch means to individually control the electrification of the several electrical units for raising the several locking bars; and have also disclosed gang switch means for gang operating the several electrical units if desired.

It is now noted that when the control bar is in its deadlocked position "A" the several vertical locking bars must be in their lowered and locking positions. Such condition will appear from a detailed explanation and description hereinafter. It is, however, possible to attain this result when one or more of the doors are in open or not fully closed condition. Under such conditions any non-fully closed door could not be fully closed and locked without first again shifting the control bar to either its "B" or its "C" position. Furthermore, it is desirable that the guard or other authorized person be informed when all of the doors have been both fully closed and locked, before shifting the control bar to its position "A" for deadlocking the gang. Accordingly, I have provided signal means for each door or each gang of doors to show when such door or such gang is in its fully locked and fully closed condition, such means conveniently taking the form of a signal lamp in the case of each door, and also in the case of each gang of doors so to be controlled. These signal lamps are conveniently located in or adjacent to the control stand already referred to.

Other objects and uses of the invention will appear from a detailed description of the same, which consists in the features of construction and combinations of parts hereinafter described and claimed.

In the drawings;

Figure 3 shows a vertical section taken on the line 3—3 of Figure 2, looking in the direction of the arrows, but on enlarged scale as compared to Figure 2; and Figure 3 shows only the upper one-half of such section;

Figure 1:
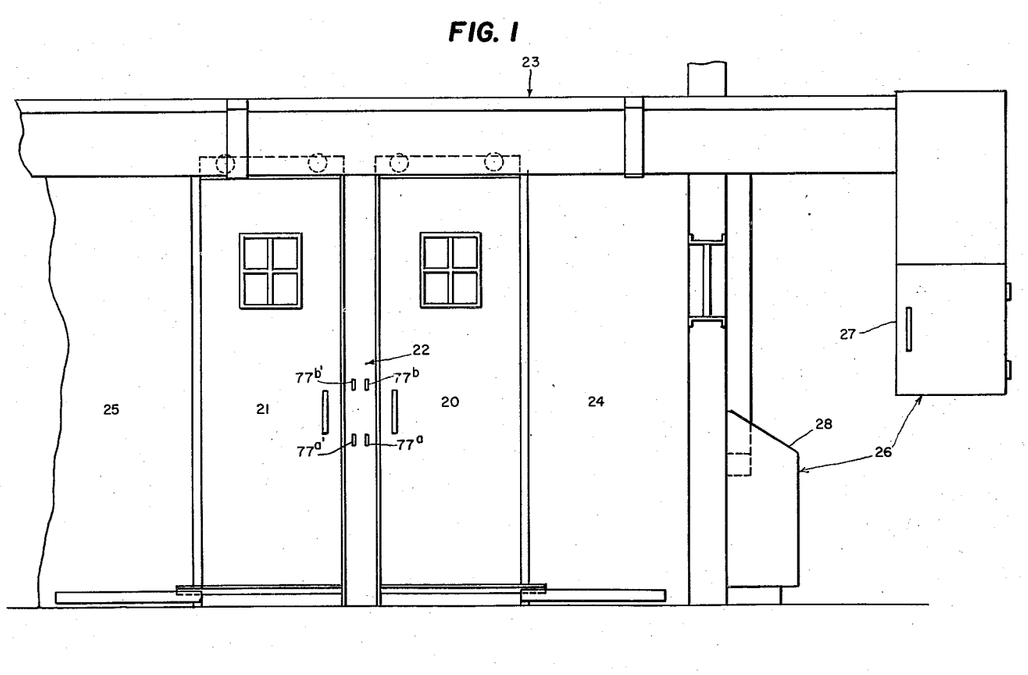
Figure 1 shows an elevational view, largely schematic, of the front faces of two cell door installations at the end of a cell block, together with a control stand arrangement for such cells, all embodying the features of my present invention; and in this showing I have illustrated such two doors as being mounted for sliding movement towards a common pilaster between their closed positions.

In Figure 1 I have shown the two horizontally slidable doors 20 and 21 in their closed positions so that their closing edges have been brought close to the pilaster 22. Along the upper portion of the structure there extends the enclosure 23 within which various control and operating elements are contained, according to conventional construction. The two adjoining cells 24 and 25 corresponding to the doors 20 and 21 are schematically shown, the doors moving horizontally across or within such cells as well known in such structures. These two cells may be considered as illustrative of a gang of cells for purposes of disclosure. The control stand is shown at 26 at one end of the gang of cells. I have shown such control stand as including the sections 27 and 28. The section 27 will be described in necessary detail hereinafter.

Referring next to Figures 2 to 8, inclusive, I have therein shown in greater size than that of Figure 1, the controlling and operating elements for the two cells 20 and 21. Such showing is made with the two cell doors fully closed to the pilaster 22, and with the gang control bar in its position "B" with both doors locked by the lowered locking bars.

Figure 16:
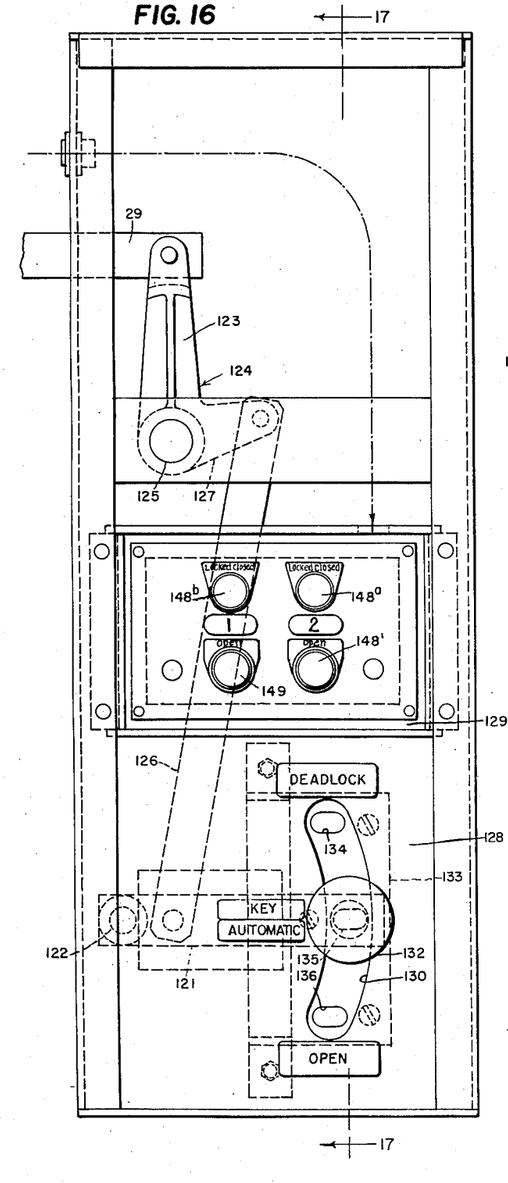
Figure 16 shows a face view of a convenient form of control cabinet with provision for control of a gang of two cell doors, with provision for manual operation of the control bar into its several positions, and provision for electrical control of the operations of the vertical locking bars of such cell doors.
Figure 17:
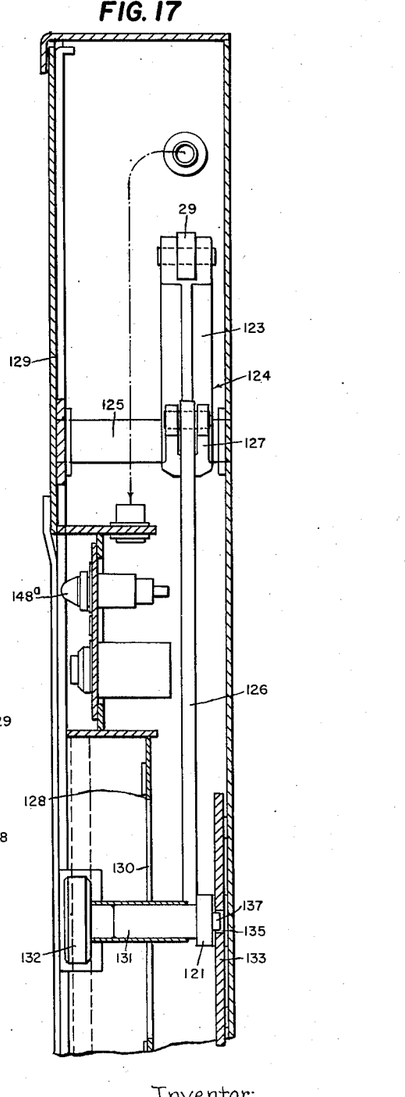
Figure 17 shows a vertical section taken on the line 17—17 of Figure 16, looking in the direction of the arrows.

The horizontally shiftable control bar 29 extends along the enclosure 23 above the various cells which it serves, being supported by the rollers 30 carried by the back plate of such enclosure according to conventional practice. This control bar extends rightwardly to the upper portion of the control cabinet section 27 as shown in Figures 16 and 17. It can be shifted back and forth by manual means contained within such cabinet. Each of the cell doors is carried by rollers 31 which are journalled behind a hanger plate 32 extending up from such door and formed to reach under and forwardly of the bottom plate 33 of the enclosure 23 as well shown in Figure 3 in particular.

Figure 2:
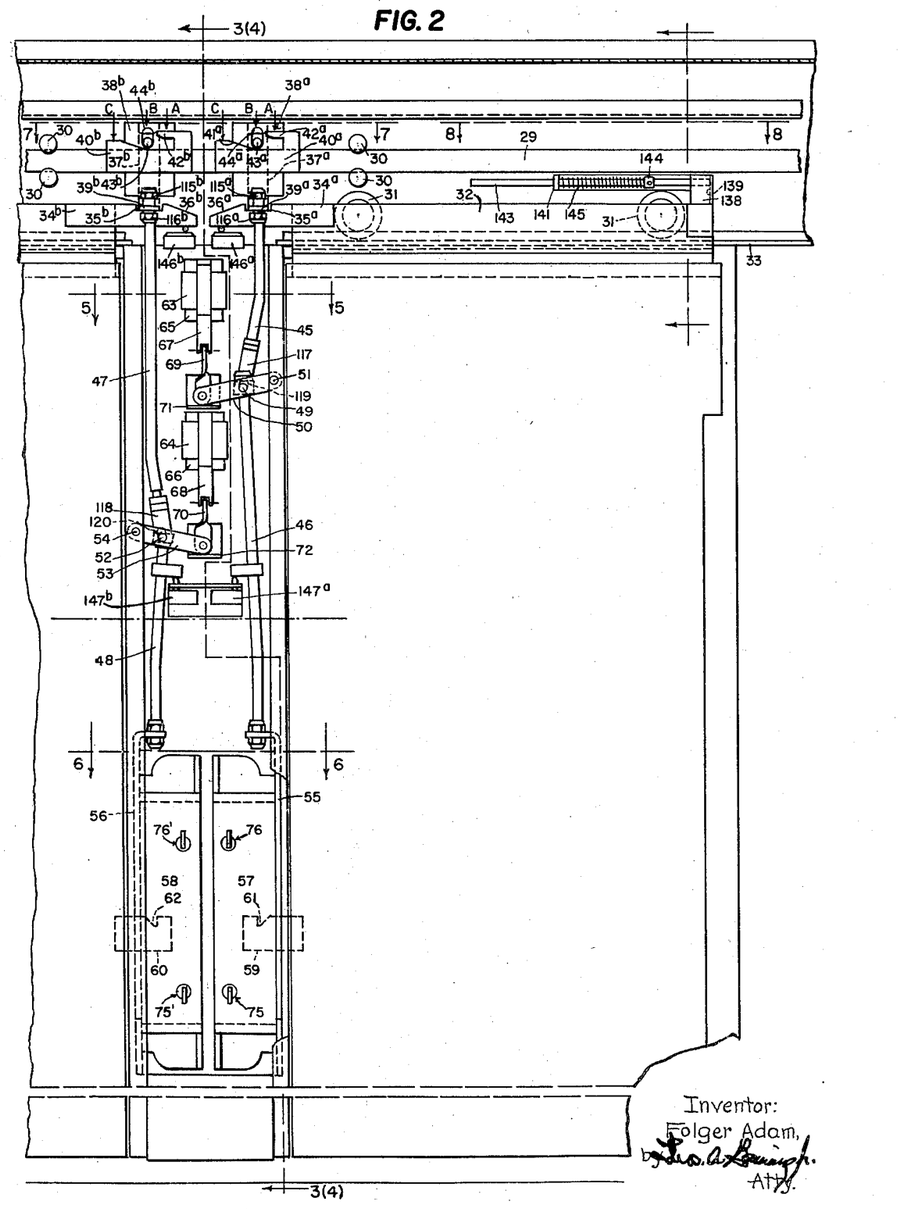
Figure 2 shows, on larger scale than Figure 1, and with cover plates removed, one embodiment of my present invention, showing the longitudinal housing for the control bar and the door trackway, and the door starter, etc., and also this figure shows the vertical locking bars for the two adjacent doors, the key locking units for such two doors, and the individual locking bar operating solenoids for the two locking bars; the lower portion of the pilaster being shortened to bring the total vertical dimension into smaller compass; and in this figure the control bar is in its "B" position.

To the closing edge portion of the upper part of each door there is connected a projecting lug or extension 34 which extends into the upper portion of the pilaster, or registers therewith when the door is closed as shown in Figure 2. For purposes of clarity I have designated the two such elements for the two doors as 34ª and 34ᵇ, respectively. Each of these extensions is provided with a notch 35 in its upper edge, being the notches 35ª and 35ᵇ for the two doors, respectively. The end portions of these extensions are cammed or slanted as shown at 36ª and 36ᵇ for the two elements, such cams slanting down from the bodies of the extensions to their extreme ends.

Directly above but behind the door closed position of each of the extensions 34 is an L-shaped vertically movable element 37 (see Figures 2 and 3), being designated as 37ª and 37ᵇ, respectively corresponding to the two doors. These elements 37 are retained in proper position with respect to co-operating parts by bracket plates 38 secured to the back plate of the enclosure. Such bracket plates are well shown in Figure 7, where it is evident that each such bracket plate is vertically slotted to accommodate the corresponding L-shaped element, thus providing for the vertical movability of such L-shaped element. The lower angled end 39 of each of these L-shaped elements extends forwardly to a position above the path of travel of the extension of the corresponding door and is of width which may be accommodated within the notch 35 of such extension when such L-shaped element is allowed to move down far enough. (In Figure 1 both of the L-shaped elements have descended into engagement with the corresponding notches, the doors being fully closed.) Due to the camming of the end portions of the extensions it is possible for each door to be moved to its fully closed position even when the corresponding L-shaped element is in lowered position, and such L-shaped element will then fall into the corresponding notch at conclusion of the door closing movement. Thus the door will be locked closed by a locking operation at its upper edge portion. Thereafter, to unlock such upper door edge portion it will be necessary to raise such L-shaped element sufficiently to free its horizontal lower angled end 39 from such notch. (Note; various elements which are duplicated on or for the two doors have been designated with the suffixes "a" and "b" to define the doors with which they are associated, and this form of designation will be further followed hereinafter.)

Figure 7:
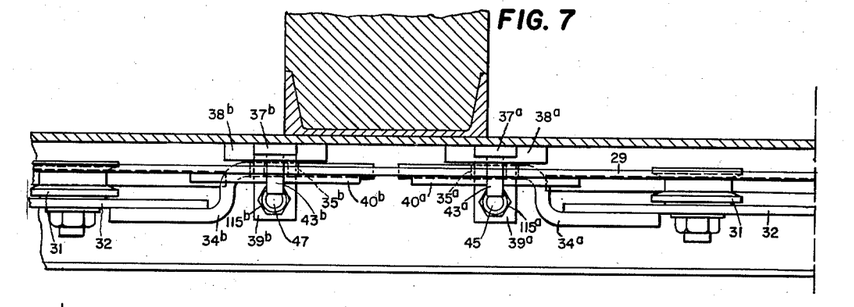
Figure 7 shows a horizontal section taken on the line 7—7 of Figure 2, looking in the direction of the arrows, but on enlarged scale as compared to Figure 1; and this figure shows substantially the left-hand one-half of the structure shown in Figure 2.

Each of the L-shaped elements may be controlled or operated either by horizontal movement of the control bar 29 or by vertical movement of the corresponding locking bar, presently to be described. To the foregoing end the control bar is provided with an engaging plate 40 corresponding to each such L-shaped element. These engaging plates 40 are conveniently secured to the front face of the control bar and have parts which extend up higher than the top edge of the control bar itself as shown in Figure 2. Such higher extensions include the cam edge portion 41 at the left-hand portion of each such plate, and the overhanging or hook portion 42 at the right-hand portion of each such plate. Each L-shaped element 37 is provided with a forwardly extending stud 43 which reaches through a vertically extending slot 44 of the corresponding bracket plate and to a position above the proximate portion of the control bar and corresponding engaging plate 40. These studs may thus ride on the upper edge portions of the control bar and/or the upper edge portions of the corresponding engaging plates. The studs are of size to be received within the hook portions of the engaging plates when the control bar and the corresponding L-shaped element are in registering position with respect to each other. Evidently, leftward shift of the control bar from its position shown in Figure 2 will bring the hook portions of the engaging plates over the corresponding studs, thus locking such studs and corresponding L-shaped elements against rise from their positions shown in Figure 2. Contrarily, rightward shift of the control bar will bring the camming portions of the engaging plates into engagement with such studs, thus raising the L-shaped elements and their angled end portions 39 an amount dependent on the amount of the camming action. In Figure 2 I have indicated by the letters "A," "B," and "C" the positions of the center of one of the engaging plates corresponding to the three like designated control bar positions. In Figure 2 the control bar has been brought to its position "B" so that the corresponding stud 43ª is in engagement with the low portion of the engaging plate, but slight movement of the control bar rightwardly will commence the camming engagement which will raise such stud to its finally raised position, with corresponding raising of the L-shaped element. The relative positions of the lower angled end 39 and the stud of each L-shaped element are such, compared to the hook portion of the corresponding engaging plate and the corresponding notch 35 of the door extension element 34 that when the stud is thus locked in the hook portion the angled end 39 is locked into the notch, thus deadlocking the door in its closed position. Examination of Figure 7 shows that each of such extension elements is formed inwardly towards the back plate of the enclosure, and towards the bracket element 38 so that the forward projection of the stud and the forward projection of the angled end 39 needed to effect such deadlocking engagement are reduced to a minimum amount with corresponding advantages of stiffness, etc.

The means for shifting the control bar back and forth will be disclosed hereinafter.

Corresponding to each door locking and control mechanism there is provided a vertical locking bar. In the embodiment now being described two such locking bars are housed in the pilaster 22 since the two doors both close to that pilaster and both of the L-shaped elements 37ᵃ and 37ᵇ are located above such pilaster. The right-hand locking bar includes the upper and lower sections 45 and 46, respectively, and the left-hand locking bar includes the upper and lower sections 47 and 48, respectively. The sections 45 and 46 are brought together at a common pivot pin 49 which also pivots them to the lever bar 50. This lever bar is pivoted to the pilaster at the point 51. Likewise the sections 47 and 48 are brought together at a common pivot pin 52 which also pivots them to the lever bar 53, pivoted to the pilaster at the point 54. The lower ends of the sections 46 and 48 are connected to the upper angled ends of vertical slide bars 55 and 56, respectively. These, in turn, are slidably mounted against the opposite inside faces of the pilaster sides, and against the proximate outwardly facing surfaces of the two key-locking devices 57 and 58, presently to be described in detail. In Figure 2 I have shown by dotted lines the hook-shaped tongues 59 and 60 connected to the edges of the two doors in alignment with the two locking devices 57 and 58, and extending through suitable openings in the proximate portions of the pilaster sides into the bodies of the two locking devices themselves, the two doors being in closed positions. The key-locking devices are so designed and constructed that locking bolt elements comprising portions of such locking devices may be engaged with or disengaged from the notches 61 and 62 of these tongues according to the desired locking and unlocking operations of such key-locking devices.

Figure 3:
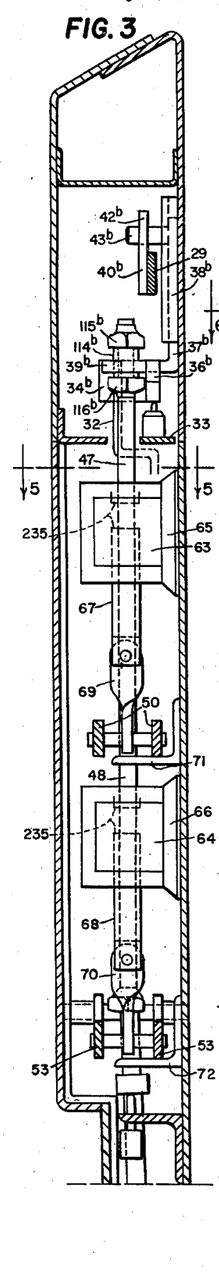

Corresponding to the two levers 50 and 53 I have provided the two solenoids 63 and 64 suitably supported by brackets 65 and 66 secured to the back wall of the pilaster. The armatures 67 and 68 of these solenoids work vertically, being normally in lowered condition as shown in Figures 2 and 3. Such armatures connect to the free ends of the levers 50 and 53 by the links 69 and 70, respectively, suitable pivotal connections being provided to take care of angularity during movements of the parts. I have also provided the brackets 71 and 72, secured to the back wall of the pilaster, and which limit the downward movements of the levers when released by non-energization of the solenoids, and when the locking bars are not raised by the movement of the control bar to its "C" position, or otherwise.

It is now apparent that each vertical locking bar can be raised either by movement of the control bar to its "C" position or by energization of its solenoid. Thus the unlocking of the upper edge portion of each door may be effected in either manner. It is also apparent that shift of the control bar to its "C" position will necessarily raise both (all) locking bars which are under its control, thus simultaneously unlocking the upper edge portions of all such doors by such control bar movement. It is also apparent that any selected locking bar may be individually raised by energization of its particular solenoid, without need of shifting the control bar to its "C" position, provided that such control bar be then in its "B" position. Thus any selected door may have its upper edge portion unlocked independently of other door locking operations, and independently of the control bar, provided such control bar be then in its "B" position. Likewise, by the provision of proper circuitry any group of cell door locking bars may be simultaneously raised by energization of their several solenoids, also irrespective of shift of the control bar to its "C" position, and provided it be then in its "B" position. It is here noted, however, that if the control bar should be set at its "A" position with any one or all of the studs 43 for the several doors engaged with the hook portions of the plates 40, no such door's locking bar could be raised, either by force applied to such locking bar manually, or by energization of its solenoid, and such door or doors would remain locked at its or their upper edge portions.

Reference is now made to the key-locking devices 57 and 58, for which purpose reference is made to Figures 11, 12, 13, 14, and 15. These figures illustrate one of such key-locking devices, and since all of them are alike such description of one of them will serve for all.

Figure 4:
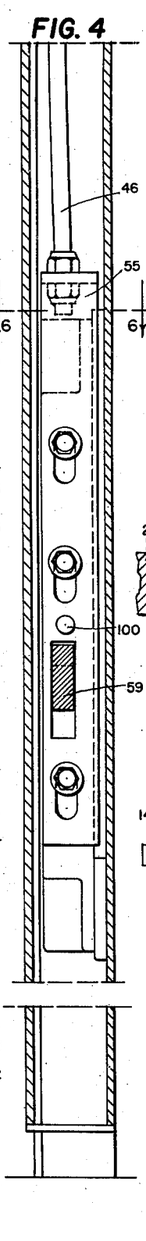
Figure 4 shows the vertical section of the lower one-half of the pilaster, being the section of the lower one-half taken on the line 3—3 of Figure 2, looking in the direction of the arrows.
Figure 5:
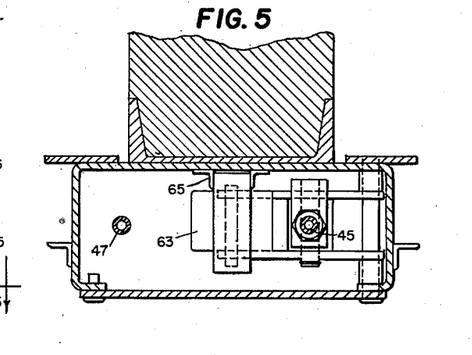
Figure 5 shows a cross-section taken on the lines 5—5 of Figures 2 and 3, looking in the directions of the arrows.
Figure 6:
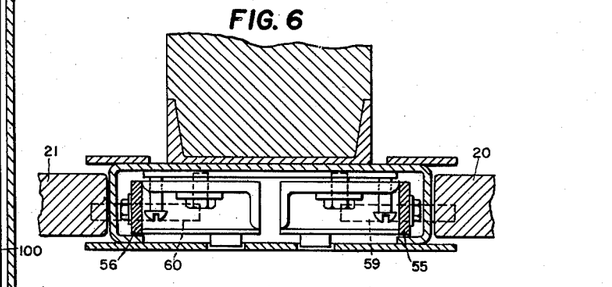
Figure 6 shows a cross-section taken on the lines 6—6 of Figures 2 and 4, looking in the directions of the arrows.
Figure 11:
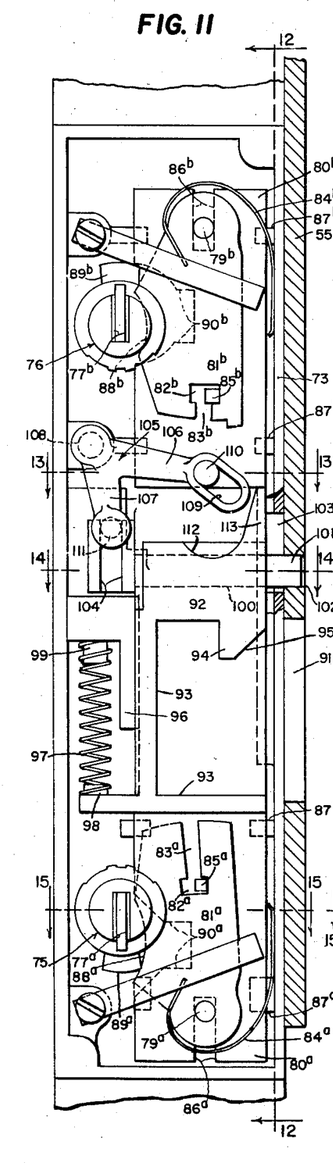
Figure 11 shows a face view of the key-locking unit shown in Figures 2, 4, and 6, with the cover plate removed, but on enlarged scale as compared to such earlier figures; and in Figure 11 the upper key-operated section has been key-operated to project the pin or stud outwardly for connecting the hook element of the key-operated unit to the vertical locking bar, both such locking bar and such hook element being in their lowered or door locking positions.
Figure 12:
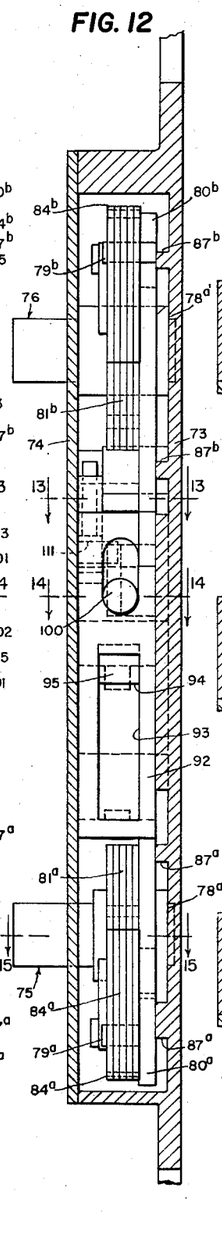
Figure 12 shows a vertical section taken on the line 12—12 of Figure 11, looking in the direction of the arrows.
Figure 13:
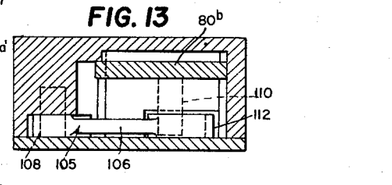
Figures 13, 14, and 15 show cross-sections taken on the lines 13—13, 14—14, and 15—15, respectively, of Figures 11 and 12, looking in the directions of the arrows.
Figure 14:
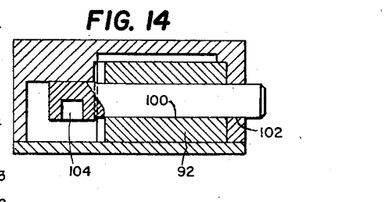
Figure 15:
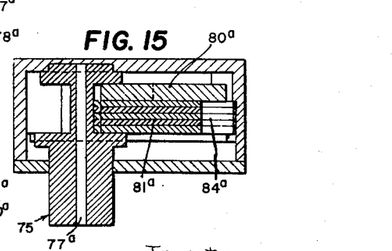

Such locking device includes the housing 73 (the cover plate being removed in Figure 11, but shown in place at 74 in Figures 12, 13, 14, and 15). Two key-lock cylinders 75 and 76 are set into such housing, preferably at considerably separated differences of elevation, the locking device being installed in the pilaster with its housing in vertical longitudinal position as shown in Figures 2 and 4. Each of these cylinders is adapted for reception of a proper key into its key-slot 77ᵃ or 77ᵇ, as the case may be. Each such cylinder is provided with a rear end shouldered portion 78 which is seated in a recess of the floor of the housing to act as a journal for the cylinder and retain it in proper alignment within the housing. The studs 79ᵃ and 79ᵇ are secured to the floor of the housing and project forwardly far enough to accommodate the slide plates 80ᵃ and 80ᵇ which are guided by such studs during their sliding movements; and such studs also provide pivotal mountings for the two groups of plates 81ᵃ and 81ᵇ, respectively, so that such plates are individually free to rock on the studs as required during the locking and unlocking operations.

The plates 81ᵃ and 81ᵇ are provided in their free end edges with inwardly extending notches 82ᵃ and 82ᵇ, respectively, such notches having angularly enlarged portions at their radial ends closest to the pivot studs, and being provided with gates 83ᵃ and 83ᵇ between such enlarged portions and the free end edges of the plates. Individual leaf springs 84ᵃ and 84ᵇ for the plates are secured to the individual plates, the other ends of such springs bearing against the inside walls of the housing to thus urge the individual plates to rock towards the left in Figure 11 (being counterclockwise for the plates 81ᵃ and clockwise for the plates 81ᵇ). Studs 85ᵃ and 85ᵇ are secured to the two slide plates 80ᵃ and 80ᵇ, respectively, and these studs work into the several notches and through the gates 83ᵃ and 83ᵇ as the case may be, of the two groups of plates 81ᵃ and 81ᵇ, respectively, as follows:

The slide plates are provided with longitudinally extending end slots 86ᵃ and 86ᵇ, respectively, which slots are seated onto the studs 79ᵃ and 79ᵇ already referred to. Thus it is possible to slide each slide plate longitudinally of the housing provided such slide plate is not otherwise prevented from executing such sliding movement. It is here noted that these slide plates are located between the floor of the housing and the respective groups of rock plates 81ᵃ and 81ᵇ, respectively, and preferably suitable lugs 87ᵃ and 87ᵇ are provided in the floor portion of the housing to better retain the slide plates in position during their sliding movements. The parts are so related and proportioned that the sliding movement of either plate can only occur when the several rock plates of the corresponding group 81ᵃ or 81ᵇ, as the case may be, have been rocked to positions such that the gates of all of the plates of such group are brought into register in line with the stud 85 of the corresponding slide plate. Such registry of the plates 81 is brought about as follows:

The edge of a key inserted through the key slot of the cylinder is serrated at points along its length to depths such that as the key is turned each of the plates 81 will be engaged on its curved edge 88 and rocked rightwardly in Figure 11 by the amount correct to ensure the desired alignment of all of the plates' gates as above explained. Thus the gates are brought into proper registry. The rotation of the key also rotates the cylinder 76 of such lock unit. This cylinder is provided with a radially extending sweep 89 so placed that as the plates have been brought into register such sweep will come into engagement with a notch 90 of the corresponding slide plate. Further rotation of the key and cylinder will then force the slide plate endwise, its stud 85 moving through the registered gates as above explained. Having shifted the slide plate the distance needed to carry its stud 85 through the gates the further rotation of the key and cylinder will cause the serrated edge of the key to move away from the curved edges 88 of the plates 81, allowing the plates to rock back under urging of their springs, and thus again causing the gates of the plates to move away from their condition of register. Thus the stud 85 of the slide plate will have been shifted to the outside of all of the plates 81 of the group, and such stud will now be locked against back shift until the plates have been again rocked into register of their gates by a reverse rotation of the key, and then corresponding reverse engagement of the sweep 89 with the slide plate to shift such slide plate back to its original position.

The section 55 of the vertical locking bar (see Figures 2, 4, and 11) extends vertically past the location of the corresponding key-locking unit 57, and a like relation exists between the section 56 and the key-locking unit 58. Each of these locking bar sections is provided with an opening 91 of vertical dimensions sufficient to allow the tongue 59 (or 60) of the corresponding door to move through such opening as the door is closed to its locking position. Additionally each such opening 91 is further enlarged vertically sufficiently to permit the locking-bar section to move vertically through that distance of movement which such locking-bar executes between its door locked and unlocked positions already referred to, without jamming against the tongue 59 or 60 of the corresponding door when closed, it being noted that such door tongue does not shift vertically but travels back and forth horizontally with door movements.

Within each key-locking unit there is mounted a tongue engaging element 92 which is slidable vertically within the key-lock housing. This element 92 is provided with a recess of substantial size which opens at that side towards the corresponding door. Such recess is designated 93 and is of thickness across the width of the key-lock unit sufficient to accommodate the thickness of the tongue and of depth in the direction of door movement sufficient to accommodate the tongue when the door is fully closed. The vertical dimension of such recess is sufficient to accommodate the height of the tongue plus an amount of movement needed to effect locking and unlocking operations as follows:

A lug 94 extends down within the recess 93 from the roof of such recess an amount substantially the same as the depth of the notch 61 (or 62) of the door's tongue and this lug is properly located both as respects its vertical position and its distance inwardly of the key-locking unit housing to allow such lug 94 to move down into the notch of the door's tongue and effect locking engagement with such tongue notch as the door closing movement is completed. To permit the door closing movement to be completed and such locking engagement to occur with a "snap" operation such lug 94 is cammed on its door facing edge 95 as shown in Figure 11. Thus, as the door closing movement nears its completion the leading edge of the tongue 59 (or 60) will press against such cammed edge of the corresponding lug 94, forcing the element 92 to rise sufficiently to pass the tongue fully into the recess 93, and as the door closing movement is completed such element 92 may descend carrying its lug 94 into the notch 61 (or 62) and completing the door locking by such key-operated unit. Thereafter the unlocking of the door at such key-operated unit can only be performed by raising the element 92 sufficiently to disengage the lug 94 from the notch of the door's tongue.

The following comments are now pertinent as respects the structures so far disclosed:

First; both the locking and unlocking operations require vertical movement of the element 92 at least as great as the movement needed to disengage the lug 94 from the notch of the tongue.

Second; the locking operation may be effected either by the snap operation already mentioned, or by purposely raising the element 92 prior to door movement to its locking position, with later lowering of such element 92 after the door's tongue has been moved completely to its final position.

Third; such vertical movements of the element 92 other than that of the snap operation may be of controlled nature, and effected by any suitable means provided for that purpose.

Fourth; by locking the element 92 against rise after the locking operation has been completed any unlocking may be prevented thus enabling the door to be "deadlocked" merely by preventing such rise of the element 92.

The following further conditions are now noted, as subordinate to those just above enumerated:

A. Vertical movements of the element 92 may be produced either by a key operation effected by a key inserted into the lower cylinder's slot 77ª and proper rotation of that cylinder, being a key-operated operation; or by B. Connecting the said element 92 to the locking-bar section 55 (or 56) so that raising or lowering such locking bar section will effect the desired vertical movements of such element 92.

It is further noted that, having so connected the element 92 to such locking bar section, it is then possible to dead-lock such element 92 against the rise of such element by merely dead-locking the locking bar itself under such condition of connection of the element 92 thereto. This may be considered as condition C. (Corresponding to the dead-locked position "A" of the control bar.)

The means whereby the foregoing relationships are made possible are now described, as follows:

The element 92 is guided in its vertical movements by suitable guides formed in the housing and including the left-hand vertical guide rail 96. At its right-hand edge such element 92 slides in engagement with the right-hand face of the housing. A suitable spring 97, placed between the lug 98 of the element 92 and a portion 99 of the housing urges the element 92 downwardly into its lowered or normal position, being its locking position. The lower slide plate 80ª normally stands in the position shown in Figure 11 wherein its downward movement has been limited by engagement of the end of its slot 86ª with the stud 79ª. The lower end of the element 92 rests against the upper end of such slide plate so that the normal lowered position of such element 92 is that thus dictated by the lowered position of such slide plate 80ª. Raising such slide plate by the key-operation already described will then raise the element 92, and the parts are so proportioned that the desired raising movement is effected to enable producing the operations already explained. It is thus evident that the function of the lower key-locking unit is to enable key operation for raising the element 92 on occasion. However, it is also noted that since such element is not positively connected to such slide plate the element 92 may be raised by other means without need of also raising the slide plate.

Next, I have provided a horizontally shiftable pin 100 which extends through the upper portion of the element 92. This pin is of length such that it projects in both directions beyond the right-hand and left-hand edges of such element 92. Such right-hand projection is conveniently in the form of a circular end portion 101 which, when the pin 100 is shifted fully to its right-hand position (shown in Figures 11 and 14) extends far enough rightwardly to extend through an opening 102 formed in the locking bar section 55 (or 56). On the contrary, by shifting such pin 100 leftwardly its right-hand end portion 101 will be withdrawn from engagement with such locking bar section, thus disconnecting the locking bar section from the element 92 within which such pin works. When so withdrawn leftwardly the pin end portion 101 may be allowed to project just to the right-hand outer face of the housing 73. Such right-hand housing portion is then provided with a vertically slotted opening 103 of vertical dimension sufficient to allow the pin to ride up and down within such slotted opening by amount needed to accommodate the vertical movements of the element 92 already explained.

The left-hand end of such pin 100 is provided with a vertical slot 104 on one face, the left-hand end portion of the pin being vertically enlarged to an amount such that said slot may be of vertical dimension at least equal to the vertical movement of the element 92. A bell-crank 105, having the arms 106 and 107 is pivoted to the housing at the point 108, the parts being so formed and proportioned that the bell-crank may execute rocks of amount needed to enable the desired functions to be performed. The bell-crank arm 106 is provided with an elongated slot 109 which receives the pin 110 carried by the slide plate 80ᵇ of the upper key-operated unit. The arm 107 of the bell-crank carries a pin 111 which extends into the slot 104 of the pin 100, so that rock of such bell-crank in either direction will produce corresponding horizontal shift of the pin 100. It will now be apparent that up and down movements of the slide plate 80ᵇ will produce corresponding horizontal shifts of the pin 100, and the parts are so proportioned that such horizontal pin movements will be sufficient to produce the operations already explained. Thus it is possible, by use of the upper key-locking unit to either project the pin 100 rightwardly sufficiently to connect the element 92 to the locking bar section 55 (or 56) so that both such elements must then rise and lower together, or to retract such pin 100 sufficiently to disengage the element 92 from such locking-bar section.

It is here noted that the bell-crank element is located at the cover plate face of the key-lock unit and is of thickness less than that of the element 92. Such fact is apparent from examination of Figure 13 in particular. The upper portion of the element 92 is slightly notched downwardly as shown at 112 to accommodate the bell-crank arm 106 during rocks of the bell-crank. However, the element 92 is shown as being provided with an upwardly extending flange portion 113 at its right-hand edge, such flange portion overlying the slotted opening 103 of the housing 73 for all vertical movements of the element 92, and thus preventing the insertion of foreign materials into the key-lock element which materials would interfere with the proper operation of such key-lock unit. The slide plate 80ᵇ is behind the slotted opening 103 so that it is possible to thus provide such flange portion 113 of sufficient height to perform its intended function of sealing off the slotted opening without interfering with the vertical movements of the slide plate, such slide plate lying back of the element 92 in the locations where such parts overlie each other.

From the foregoing description it is now apparent that the functions of the lower key-lock unit are to raise and permit lowering of the element 92 by key means and other than the vertical movements of the locking bar section 55 (or 56), while at the same time permitting such element 92 to be raised independently of corresponding rising movement of the slide plate when such raising it to be effected by use of the locking bar section. It is also now noted that by raising the lower slide plate by its key operation, under the further condition that the pin 100 has been projected rightwardly to connect the element 92 to the locking bar section, it is possible to at the same time raise the complete locking bar with corresponding unlocking of the upper edge of the door, it being assumed that the control bar is then in its position "B" and not dead-locked at position "A." It is also contrarily noted that when the pin 100 has been projected rightwardly to engage the element 92 to the locking bar section, up and down movements of the locking bar section will also be communicated to the element 92 for corresponding locking and unlocking movements of the lug 94 with the tongue 59 (or 60) of the corresponding door. It is also seen that under such condition that with the pin 100 in its projected condition to connect the element 92 to the locking bar section the movement of the control bar to its "A" or dead-locked position will also dead-lock the element 92 against rising movement either by key operation or otherwise, thus doubly dead-locking the door under such conditions. It is here pointed out that the connections between the upper end of each locking bar section 45 (or 47) and the corresponding flange 39ᵃ (or 39ᵇ) (which flanges engage the notches 35ᵃ (or 35ᵇ) of the extensions 34ᵃ (or 34ᵇ) for door locking at the upper edge of the door) are such that when a locking bar 55 is locked down as just above described the corresponding flange 39ᵃ (or 39ᵇ) may be raised by the control bar movement to its "C" position, sufficiently to disengage from the corresponding notch 35ᵃ (or 35ᵇ) to allow door movement when the key locking unit 75 is actuated to raise the element 92, the key locking unit 76 having been operated into the condition shown in Figure 11. This is all true due to the provision of the lost-motion between the locking bar section 45 or 47 and the companion flange 39ᵃ (or 39ᵇ), which lost-motion will be hereinafter again referred to. Therefore, with the present arrangements it is possible to release the flange 39ᵃ (or 39ᵇ) from the companion notch 35ᵃ (or 35ᵇ) when the locking bar 55 is tied to the element 92 of the key lock unit 75, by proper actuation of the other lock unit 76, the locking bar remaining in its lowered position, and the element 92 (and lug 94) still locking the door at the location of the key units 75 and 76. It is also seen that with the pin 100 retracted leftwardly to disengage it from the locking bar section the element 92 is free to shift up and move down for snap locking operations, without need of correspondingly raising and lowering the entire locking bar. Thus very easy and dependable snap locking operations may be produced under such conditions.

The upper portion of the locking bar section 45 is extended through the horizontal flange 39ᵃ (or 39ᵇ) as well shown in Figures 2 and 3. Conveniently a sleeve 114 extends through the flange; and nuts 115 and 116 are threaded onto the locking bar section and into compressing engagement with such sleeve. These nuts extend out beyond the sleeve far enough to engage with the top and bottom faces of the flange 39. However, it is now evident that by properly proportioning the length of such sleeve an amount of lost motion may be provided between the locking bar and such sleeve, so that vertical movements of the sleeve under urging of the corresponding L-shaped element 37ᵃ (or 37ᵇ) for engagement of the horizontal flange 39 of such element with the notch 35, or for disengagement of such parts from each other, under control and operation of the control bar may be effected independently of the locking bar section 45. Thus, for example, such lost motion may be such that complete unlocking of the upper edge of the door by control bar movement to the position "C" may be effected without need of raising the locking bar, which is of considerable weight. Thus, if the key operated elements should at such time be in their unlocked condition the door could be completely unlocked with exertion of a minimum force to effect the necessary endwise movements of the control bar. In this connection it is noted that the L-shaped element 37 is normally returned to its lowered or locking position by gravity, and that when in such position the lost motion between such element and the upper end of the locking bar is a small amount, so that the vertical movement of the locking bar needed to effect rise of the L-shaped element for unlocking by use of the key-operated units is only slightly more than the actual amount of vertical movement needed to free the horizontal flange 39$^a$ (or 39$^b$) of the L-shaped element from the notch 35$^a$ (or 35$^b$). It is also noted that the locking bar sections 45 and 47 include the bars 117 and 118, respectively, and that the pins 49 and 52 already referred to extend through vertical slots 119 and 120 of such bars (the slot 119 of the bar 117 being concealed in Figure 2). These slots are of sufficient vertical dimension to permit raising movements of the locking bars to be executed sufficient to effect unlocking operations without need of simultaneously raising the levers 50 (or 53) and the armatures of the solenoids. Thus the force needed to effect key-unlocking operations is materially reduced.

I shall now describe the control cabinet and related elements which are herein disclosed. For this purpose reference is now made to Figures 16 and 17 in particular. The control cabinet 27 of Figure 1 includes the rock arm 121 pivoted at the point 122 for swing through an angle of substantially 40 degrees either above or below the horizontal position of such arm. The end portion of the control bar 29 is brought into the upper portion of the cabinet and pivotally connected to the vertical arm 123 of a bell-crank 124 which is pivoted to the cabinet frame at 125. A link 126 pivotally connects the rock arm 121 to the bell-crank arm 127 so that movements of such rock arm are comunicated to the control bar as endwise movements thereof.

The lower portion of the cabinet is conveniently recessed as well shown in Figure 17, so that the floor of such recess, 128 is set back of the front cover 129 which encloses the upper portion of the cabinet. The rock arm 121 lies behind such recess floor 128. An arcuate opening 130 is provided in the floor 128 formed concentric with the pivotal point 122. The end portion of the rock arm 121 is provided with the forwardly projecting stud 131, hollow, and a hand knob 132 is provided in connection with such hollow stud so that the rock arm may be conveniently shifted from position to position. Behind the end portion of the rock arm there is supported a plate 133 spanning the arc through which arm rock is executed; and this plate is provided with openings 134, 135, and 136 corresponding to the positions of the rock arm at which the control bar is brought to its several positions, respectively "A," "B," and "C." The hand knob 132 is connected to a spring retracted pin, the rear end of which is shown in Figure 17 at 137, and the retracting spring (not shown) urges the knob and the pin rearward to cause engagement of such pin's rear end with one or the other of the openings 134, 135, or 136 as the case may be, and according to the position at which the rock arm (and the control rod) is to be arrested and temporarily locked. Conveniently the three arm positions are legened "Deadlock," "Key-Automatic," and "Open" as shown in Figure 16, corresponding to the positions "A," "B," and "C" of the control rod as previously named. It is thus evident that I have provided a simple and convenient means to shift the control rod to its several positions, and to lock it in a selected position for the time being.

A suitable cover, not shown, may be provided for enclosing the recessed portion of the cabinet, including the hand knob element; and such cover may, if desired, be provided with suitable key operated locking means for securely locking the cover in its closed position.

The following comments respecting the several operations are now in order:

Assuming that all of the doors of the gang are in their fully closed and locked positions, the control bar may be shifted to its "A" position to carry the hook elements 42 into engagement with the studs 43, thus preventing rise of the locking bars as already explained. Next assume that the control bar is shifted to its "B" position, being its position shown in Figure 2 and elsewhere. This will carry the hook elements 42 away from the studs 43 so that now the several locking bars may be raised by suitable means, but until such raising has been executed the doors will still remain locked closed, although they will not now be deadlocked, as already explained. Under this condition it is possible for the guard or other authorized person to go to any selected cell door and effect unlocking of such door by key lock operation. For this purpose he will first cause the pin 100 of the key-locking unit on the pilaster to be projected out (rightwardly in Figure 11) by use of a proper key inserted through the opening 77$^b$, with subsequent rotation of such key to rock the bell-crank 105 and project the pin. Since the vertical locking bar section 55 (or 56) is at the time in its fully lowered position its opening 101$^a$ is registered with the pin 100 so that such pin may be fully projected by the key-lock operation just described. This will lock the element 92 to the locking bar section so that both of these elements will now have to travel up and down together as long as such locked together condition obtains.

Next, the element 92 may be raised by key-lock operation to also raise the locking bar section, as follows:

By insertion of a proper key into the cylinder slot 77$^a$ and rotation of such key the slide plate 80$a$ may be raised to thus raise the element 92 which is resting on such slide plate thus also raising the locking bar which is now locked to the element 92 as already explained. Thus, by the two key-lock operations the locking bar may be raised, thereby also raising the flange 39 and disengaging it from the notch 35 of the door extension 34. Thus the upper edge portion of the door will be unlocked. Also, the raising of the element 92 within the key-locking unit will release the lug 94 from the notch 61 of the tongue 59 carried by the door edge. Thus unlocking will also be effected at this point, so that the door will now be completely unlocked and free to be opened as desired.

It is here noted that the lost-motion at the location of the sleeve 114$^a$ (or 114$^b$) will be proportioned according to the length of said sleeve which length establishes the clearance between the nuts 115$^a$ and 116$^a$ (or 115$^b$ and 116$^b$). Also, that a relation exists between said lost-motion and the rise produced by the cam surface 41 of the corresponding plate 40. Such cam rise is sufficient to take up the lost motion and then also raise the flange 39 high enough to disengage the same from the corresponding notch 35 to unlock the door at that point. If the came rise be greater than such amount needed to produce unlocking, then the excess cam rise will also cause the locking bar 45 to be raised. Thus the corresponding slide bar 55 will also be raised with raising of the second locking element 94 of the key lock unit. If the cam rise be not appreciably greater than needed to raise the flange 39 high enough to produce unlocking, then the control bar movement to position "C" will not of itself produce unlocking at the key lock unit. In any case, however, the locking bar can be raised by key lock operation when the slide bar 55 has been engaged by the pin 101 of the key lock unit; and such rise of the locking bar thus produced by key lock operation may be sufficient to cause rise of the flange 39 by engagement of the nut 116 with such flange, to release the flange 39 from the notch 35, thus unlocking the door by keylock operation, it being assumed that the control bar is in its "B" position.

It is further noted that the flange 39ª (or 39ᵇ) is fully within the companion notch 35ª (or 35ᵇ) of the door extension 34ª (or 34ᵇ) when the hook portion 42ª (or 42ᵇ) of the corresponding engaging plate 40ª (or 40ᵇ) of the control bar is in the "A" position. Thus, notwithstanding the lost-motion of the flange 39ª between the nuts 116ª and 115ª (or 116ᵇ and 115ᵇ) it is impossible to disengage such flange from the notch when the control bar is in its deadlocked position "A."

Figure 8:
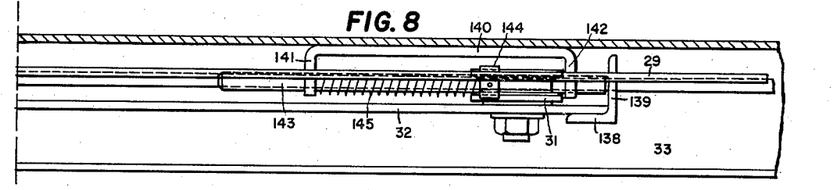
Figure 8 shows a horizontal section taken on the line 8—8 of Figure 2, looking in the direction of the arrows, also on enlarged scale as compared to Figure 2; and this figure shows substantially the right-hand one-half of the structure shown in Figure 2.

I have not herein disclosed means to completely open the door, except insofar as the operation of a "door starter" will effect such result. I have herein shown such a door starter as follows:

Referring especially to Figures 2 and 8, I have provided a bracket or flange 138 connected to the right-hand or rear edge of the upper portion of the door, specifically, to the right-hand end of the hanger plate 32 already referred to. This flange conveniently takes the form of a length of angle bar with one of its flanges secured to the hanger plate, and its other right-angled flange 139 extending rearwardly as well shown in Figure 8. A U-shaped bar or bracket element 140 is secured to the back plate of the housing, with its two end arms 141 and 152 projecting forwardly. These end arms are located in the line of travel of the flange 139 already referred to so that as the door is closed or opened such flange 139 will come close to or recede from the right-hand arm 142 of the bracket 140. A rod 143 is slidably extended through both of the arms 141 and 142, carrying a collar 144 located between such arms. A spring 145 is set onto the rod between such collar and the left-hand arm 141, and is pre-loaded so that it constantly urges the rod 143 rightwardly. Such rod extends through the right-hand arm 142 and will be engaged by the flange 139 carried by the door, shortly before the door reaches its fully closed position. Thus the final door closing movement forces such rod leftwardly, compressing the spring by a corresponding amount, and the spring will then remain in such greater compressed condition until the door is afterwards unlocked. When such unlocking occurs the spring pressed rod will at once force the door rightwardly to start the door opening movement and to impart to the door a momentum which will usually carry it to a further extent of opening. In any case the starting movement and impulse, which impulse continues until the collar 144 engages the right-hand arm 142, or until the pre-loading of the spring has been exhausted, will be sufficient to enable the prisoner or other person to grasp the left-hand edge of the door and move the door to its fully opened position.

Next, if the control bar be further shifted to its "C" position the stud 43 of each element 37 will be raised to carry its flange 39 up, thus first taking up the lost-motion between such flange and the upper nut 115ª or 115ᵇ at the upper end of the locking bar section 45 (or 47, as the case may be). In any case, such upward movement of the flange 39 will release such flange from the notch 35 of the door extension, thus unlocking the upper edge portion of the door. If the rise of the stud 43, occasioned by movement of the slanting edge 41ª thereunder be sufficient to raise the locking bar after the lost-motion below the nut 115 has been taken up, then the up-movement of the locking bar will raise the key-lock element 92 sufficiently to disengage the lug 94 from the notch 61 of the door tongue 59, thus also effecting unlocking at that location, and completely unlocking the door. If such upward movement of the stud 43 is not sufficient to effect such raising movement of the locking bar high enough to unlock the lug 94 from the notch 61 of the tongue the door will remain locked at the position of the key-lock element, and can then be unlocked at that point by further key-locking operation. Usually the complete unlocking operation will be effected by the movement of the control bar to its "C" position.

It is now further to be noted that if, when the control bar is moved to its "C" position the pin 100 has not been shifted rightwardly to connect the element 92 to the locking bar section 55 (or 56) prior to such control bar movement to its "C" position, then the upward movement of the locking bar will not carry with it the element 92, and thus such selected cell door will remain locked at the key-locking position, notwithstanding that it has been unlocked at its upper edge. Thus when a gang operation is to be made, any one or more selected cell doors may be key-prepared, or non-prepared, so that such cell's doors will remain in locked condition when the control bar gang operation is performed.

The normal position of the lower slide plate 80ª of the key-locking unit is its lowered position. Raising such slide plate also raises the element 92 into its unlocked condition. However, it is noted that since such element 92 is not positively connected to the slide plate it is possible to raise the element 92 by extraneous means even when the slide plate is in its lowered position, shown in Figure 11. Accordingly, the following further operations are now noted:

If, after the door or doors have been unlocked and one or more of them have been opened, so as to carry the cammed projection 34 of each such door and also the tongue of such door rightwardly far enough to be completely disengaged from the corresponding locking elements (the flange 39 for the upper edge portion of the door, and the element 92 for the tongue of the door), the control bar should then be shifted back to its "B" condition, being a position in which door locking may be produced, such so-opened doors may be moved to their fully closed positions, with consequent snap-locking operations at both their upper edges and the key-locking positions. This is because, under such conditions the cammed leading end portion of the door extension 34 of each door may force its way beneath the corresponding flange 39, raising the same with succeeding drop of such flange into the corresponding notch 35; and at the same time the door's tongue may force itself beneath the lug 94 of the element 92, due to the cammed shape of the lower edge of such lug, with subsequent drop of the element 92 into its locking position. It is also noted that this latter operation may occur either when the element 92 is connected to the locking bar section by projection of the pin 100, or when such connection has not been established. In the former case (when the element 92 has been connected to the locking bar) the raising of such locking bar will be occasioned either by the snap lock raising of the element 37 due to rise of the flange 39 already explained, provided such rising movement will be sufficient to first take up the lost-motion between the nuts 115 and 116, or such raising will be effected by the movement of the door's tongue beneath the lug 94, or by both such conditions of operation. Usually the lost-motion at the location of the nuts will be sufficient to allow the upper edge portion of the door to be snap-locked without raising the locking bar sufficiently to raise the element 92 far enough to not require snapping action of the door's tongue beneath such lug 94 during the final door closing movement.

It is also noted that when the control bar is in its deadlocked position, "A," so that the pins 43 for the various doors should be engaged by the hook portions of the engaging plates 40, it is not possible to move a door which is then in its open position to its fully closed position without first moving the control bar back at least as far as the "B" position. The truth of this statement will be apparent from examination of Figure 2 from which it will be seen that when the control bar is brought to its "A" position each of the L-shaped elements 37 is locked against upward movement by such hooked portion of the corresponding engaging plate 40. This will prevent rise of the flange 39 of such L-shaped element needed to allow the cammed end of the door projection 34 to ride beneath such flange during the final door closing movement. Accordingly, the final closing movement of the door will be prevented.

Conversely, if any door of the gang be slightly open, so that the flange 39 of the corresponding L-shaped element 37 is sustained or "hung-up" by the cammed end of the door projection 34, at an elevation higher than its fully lowered position, the corresponding stud 43 will interfere with the shift of the control bar to its "A" position for deadlocking. In order to effect such shift of the control bar to its "A" position, all of the doors must be fully closed, or, if any door is not fully closed it must be open sufficiently so that the projection 34 has moved far enough from the fully closed position to allow the L-shaped element 37 to move clear down so that shift of the control bar to its "A" position will be possible, the stud 43 being then in position to allow the hook portion of the engaging plate to receive such stud.

The following further features are emphasized as comprising a portion of the present disclosures:

The flange 39a (or 39b) is directly connected to the cam follower stud 43a (or 43b) so that the movement of such flange to the unlocking position is directly controlled by the action of the cam 41a (or 41b) on its cam follower stud. Thus, as far as the unlocking of the upper portion of the door is concerned such unlocking action is not in any way controlled or produced by any raising of the locking bar 55. Accordingly, the raising of the flange 39a (or 39b) far enough to unlock the upper portion of the door has not caused engagement of the flange with the nut 115a (or 115b) until the upper edge of the door has been unlocked. Then, by key operation of the key unit 75 the element 92 may be raised to unlock the door, the key unit 76 having been previously brought into the condition shown in Figure 11 in which the pin 101 was moved out to engage the locking bar 55.

The foregoing explanations of various operations make it evident that it is desirable for the guard or other person located at the control stand to know the conditions of opening or closing of each of the doors under control of such stand, and also the conditions of the locking devices for such doors. It is also particularly desirable to supply information to the operator to inform him as to whether each door is both fully closed and locked, that is, that not only has such door been fully closed, but also whether or not its locking mechanisms have responded to lock such door. This latter statement will be clarified by examination of Figure 1 wherein it is seen that even when a specified door has been fully closed, if its locking mechanism has not properly responded the movement of the control bar to its deadlocked position cannot be properly made. Accordingly, I have provided signal means to indicate, for each door, the condition that such door is both fully closed, and its locking mechanism has moved to its locking position. To this end I provide a microswitch 146 adjacent to the fully closed door position, and another microswitch 147 in position adjacent to each of the locking bars. Each of the microswitches 146 will have its spring biased leaf reversed just as the corresponding door is fully closed, and each of the microswitches 147 will have its spring biased leaf reversed just as the corresponding locking bar reaches its door locking position. I then provide electrical circuits, one for each door, each such circuit including both of the microswitches 146 and 147 for such door in series circuit, so that the signal through such circuit will be given only under the condition that both full door closing and full locking bar movement have occurred for such door. The failure of either microswitch to close or to reverse its spring biased leaf condition will result in failure to give the proper signal for such door, so that the guard may make proper investigation to determine the cause of such failure. He will also be thus informed that the control bar cannot properly be shifted to its deadlocked position until the cause of such signal failure has been determined, and proper remedy provided to correct the trouble.

In Figures 16 and 17 I have shown the two signal lamps 148 corresponding to the two doors controlled by such control stand. These are the signal lamps just above referred to. They are designated as 148a and 148b, respectively, corresponding to the two doors. When the doors are to be deadlocked both such lamps should be illuminated before attempting to shift the control hand knob 132 and the rock arm 121 to the deadlocked position.

Figure 9:
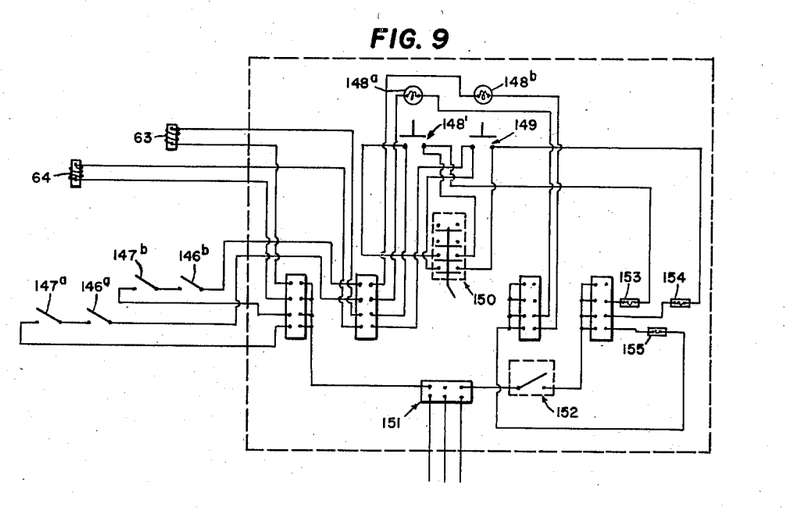
Figure 9 shows a schematic wiring diagram of circuits conveniently usable in connection with the embodiment shown in previous figures.

In Figure 9 I have shown a schematic wiring diagram corresponding to the two door control installation shown in other figures. The two solenoids 63 and 64 for electrical operation of the locking bars, and the two sets of microswitches 146a—147a and 146b—147b for giving the signals for the two doors, are shown by like designations in this diagram. I have also in this diagram shown two push-buttons 148 and 149 by which current may be delivered to the two solenoids, such push-buttons being shown directly beneath the signal lamps illustrated in Figure 16 also. Upon actuating either of these push-buttons current will be delivered to the corresponding solenoid for locking bar operation, only a short impulse of current being needed to raise the locking bar for its functioning. Thereupon such push-button depressions may be discontinued. It is, of course understood that such electrical operation under push-button control is intended to be made while the control bar is in its "B" position, since when such control bar is in its "C" position the locking bars are raised by the movement of the control bar to such position.

In Figure 9 I have also shown a gang switch 150 by which simultaneous locking bar operation is produced through electrification of all of the solenoids by the single operation of such gang switch. The electrical supply terminals are shown at 151, a main cut-out switch is shown at 152, and fuses 153 and 154 for the two solenoids are shown, as well as the fuse 155 for protecting the signal lamp circuit. Suitable terminal connector blocks are also shown according to conventional practice.

Figure 10:
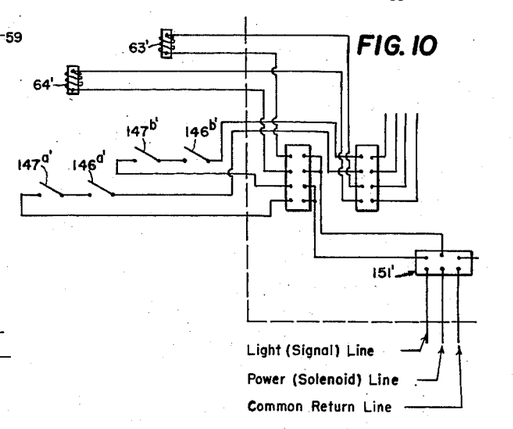
Figure 10 shows a fragmentary modification of the wiring diagram shown in Figure 9, whereby the supply of current for the signal lamps may be independent of the main power supply.

In the arrangement shown in Figure 9 the current supply for the solenoids and for the signal lamps is all received from the electrical service supply line. It is noted that in case of failure of such normal current supply the operations of the locking bars could still be effected manually either by shift of the control bar to its "C" position, or by proper key-locking operation. However, even in case of such failure of current supply from the supply mains it would still be desirable to have the benefit of the signal lamps to give indications of door closed and locked conditions before moving or attempting to move the control bar to its "A" position. When the current for signal lamp operation is received from the usual supply mains it is evident that failure of such current supply would also make the signal lamps ineffective. In Figure 10 I have shown in fragmentary form a modification of the arrangement for supplying current to the signal lamp lines from a stand-by battery or other secondary source of current so that failure of the main current supply would not disable the supply of current needed for the signal lamp operations.

I claim:

1. In a door locking system, the combination of a horizontally linearly movable door, means to support said door for back and forth movements between a door closed position and a door opened position, a horizontally extending control bar parallel to the path of door movement, means to support said control bar for reciprocating movement between a first deadlocked position, a second non-deadlocked position, and a third unlocked position, a vertically movable first defined locking element for said door, a companion door locking element connected to the door and having an upwardly facing recess for accommodation of the vertically movable first locking element when said locking element is in fully lowered door locking position, means to support said first locking element for vertical reciprocation between such fully lowered locking position and a raised position of non-engagement with said door locking element recess, such first locking element and supporting means therefor being so located that the upwardly facing recess of the door locking element registers vertically with such first locking element when the door is in said door closed position, a cam element connected to the control bar, a cam follower connected to the first door locking element, said cam and cam follower being formed for vertical movement of the first locking element between said lowered recess engaging position when the control bar is in said second non-deadlocked position and raised recess non-engaging position when the control bar is in said third unlocked position, and to permit the first locking element to remain in said lowered position when the control bar is in said first deadlocked position, cam follower movement interfering means connected to the control bar and movable therewith between a position of registry with the cam follower when the control bar is in said first defined deadlocked position and the positions of non-registry with the cam follower when the control bar is in said second non-deadlocked position and in said third unlocked position, said interfering means being constituted to retain the cam follower and the vertically movable first locking element in fully lowered position when the control bar is in its deadlocked position, together with a vertically movable locking bar, means to mount said locking bar for vertical movement adjacent to the closed door position of said door, a first key operated unit, means to mount said first key operated unit on a stationary element in position adjacent to the door closed position, said first key operated unit including a second defined vertically movable locking element movable between a lowered locking position and a raised non-locking position, and including key operated means to move said locking element between said lowered locking position and said raised non-locking position, a second defined companion door locking element connected to the door in position for locking cooperation with the second defined vertically movable locking element of said first key operated unit when the door is in its closed position and said second defined vertically movable locking element is in its lowered locking position, a second key operated unit, means to mount said second key operated unit on a stationary element in position adjacent to the first key operated unit and adjacent to the vertically movable locking bar, said second key operated unit including a movable tie element in connection with the second defined vertically movable locking element and movable vertically with said locking element, said tie element being movable between a locking bar engaging position and a locking bar non-engaging position, the second key operated unit including means to move said tie element between said locking bar engaging position and said locking bar non-engaging position, the locking bar moving vertically with said second defined vertically movable locking element between a lowered position corresponding to the locking position of the second defined vertically movable locking element and a raised position corresponding to a non-locking position of the second defined vertically movable locking element, the upper portion of the locking bar being in proximity to the vertically movable first locking element for the door, and first locking element lifting means on the locking bar in position to raise the said first locking element from its lowered recess engaging position to its raised recess non-engaging position during movement of the second defined vertically movable locking element from its lowered locking position to its raised non-locking position.

2. Means as defined in claim 1, wherein the first locking element and the vertically movable locking bar include means to permit movement of said first locking element to said recess non-engaging position independently of vertical movement of the vertical locking bar, said permitting means including an element connected to the vartically movable locking bar and having a downwardly facing shouldered part in alignment with the vertically movable first defined locking element, the shoulder of said part being located at a position on the locking bar above the first defined locking element a distance to permit movement of the first locking bar element upwardly to its raised position of non-engagement with the door locking element recess when the locking bar is in said lowered position which corresponds to the locking position of the second defined vertically movable locking element.

3. In a door locking system, the combination of a horizontally linearly movable door, means to support said door for back and forth movements between a door closed position and a door opened position, a horizontally extending control bar parallel to the path of door movement, means to support said control bar for reciprocating movement between a first deadlocked position, a second non-deadlocked position, and a third unlocked position, a vertically movable first defined locking element for said door, a companion door locking element connected to the door and having an upwardly facing recess for accommodation of the vertically movable first locking element when said locking element is in fully lowered door locking position, means to support said first locking element for vertical reciprocation between such fully lowered locking position and a raised position of non-engagement with said door locking element recess, such first locking element and supporting means therefor being so located that the upwardly facing recess of the door locking element registers vertically with such first locking element when the door is in said door closed position, a cam element connected to the control bar, a cam follower connected to the first door locking element, said cam including a rising cam follower engaging surface formed for vertical movement of the cam follower of the first locking element between said lowered recess engaging position when the control bar is in said second non-deadlocked position and said raised recess non-engaging position when the control bar is in said third unlocked position, the low end of said rising surface being at an elevation and having a length to permit the first locking element to remain in said lowered position when the control bar is in said first deadlocked position, together with a vertically movable locking bar, means to mount said locking bar for vertical movement adjacent to the closed door position of said door, a first key operated unit, means to mount said first key operated unit on a stationary element in position adjacent to the door closed position, said first key operated unit including a second defined vertically movable locking element movable between a lowered locking position and a raised non-locking position, and including key operated means to move said locking element between said lowered locking position and said raised non-locking position, a second defined companion door locking element connected to the door in position for locking cooperation with the second defined vertically movable locking element of said first key operated unit when the door is in its closed position and said second defined vertically movable locking element is in its lowered locking position, a second key operated unit, means to mount said second key operated unit on a stationary element in position adjacent to the first key operated unit and adjacent to the vertically movable locking bar, said second key operated unit including a movable tie element in connection with the second defined vertically movable locking element and movable vertically with said locking element, said tie element being movable between a locking bar engaging position and a locking bar non-engaging position, the second key operated unit including means to move said tie element between said locking bar engaging position and said locking bar non-engaging position, the locking bar moving vertically with said second defined vertically movable locking element between a lowered position corresponding to the locking position of the second defined vertically movable locking element and a raised position corresponding to the non-locking position of the second defined vertically movable locking element, the upper portion of the locking bar being in proximity to the vertically movable first locking element of the door, and first locking element lifting means on the locking bar in position to raise the said first locking element from its lowered recess engaging position to its raised recess non-engaging position during movement of the second defined vertically movable locking element from its lowered locking position to its raised non-locking position.

4. Means as defined in claim 3, wherein the first locking element and the vertically movable locking bar include means to permit movement of said first locking element to said recess non-engaging position independently of said vertical movement of the vertical locking bar, said permitting means including an element connected to the vertically movable locking bar and having a downwardly facing shouldered part in alignment with the vertically movable first defined locking element, the shoulder of said part being located at a position on the locking bar above the first defined locking element a distance to permit movement of the first locking bar element upwardly to its raised position of non-engagement with the door locking element recess when the locking bar is in said lowered position which corresponds to the locking position of the second defined vertically movable locking element.

References Cited in the file of this patent

UNITED STATES PATENTS

| | | |
|---|---|---|
| 1,043,746 | Adam | Nov. 5, 1912 |
| 1,043,748 | Allenson | Nov. 5, 1912 |
| 1,046,608 | Kosters | Dec. 10, 1912 |
| 1,542,205 | Allenson | June 16, 1925 |
| 2,148,521 | Adam | Feb. 28, 1939 |
| 2,262,673 | Hart | Nov. 11, 1941 |